Figure 1:
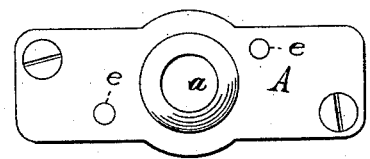

(No Model.)

A. A. LINES.
CARRIAGE TOP PROP.

No. 417,328.  Patented Dec. 17, 1889.

Witnesses.
H. L. Gleason
Mark Brownell

Inventor.
Augustus A. Lines
F. B. Brock
Atty

UNITED STATES PATENT OFFICE.

AUGUSTUS A. LINES, OF HOMER, ASSIGNOR TO THE HITCHCOCK MANUFACTURING COMPANY, OF CORTLAND, NEW YORK.

CARRIAGE-TOP PROP.

SPECIFICATION forming part of Letters Patent No. 417,328, dated December 17, 1889.

Application filed July 22, 1889. Serial No. 318,209. (No model.)

*To all whom it may concern:*

Be it known that I, AUGUSTUS ALONZO LINES, a citizen of the United States, residing at Homer, in the county of Cortland and State of New York, have invented certain new and useful Improvements in Carriage-Top Props; and I do hereby declare the following to be a full, clear, and exact description of the invention, such as will enable others skilled in the art to which it appertains to make and use the same.

My invention relates to certain new and useful improvements in carriage-top props; and it consists in the mechanism and the arrangement of parts illustrated in the drawings, as will be more fully hereinafter set forth in the specification, and especially pointed out in the claim.

The object of my invention is to fasten the joints used in supporting and letting down the top to the bows in such a way that they will not rattle or loosen the nuts, and the covering can be put on without wrinkling or straining it.

Figure 2:
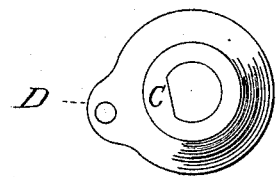
Figure 3:
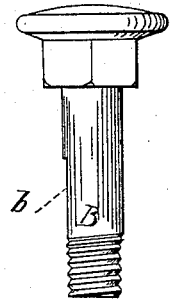
Figure 4:
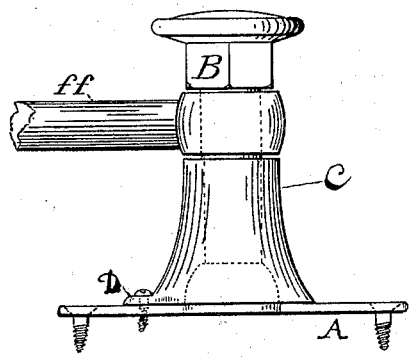

Figure 1 represents the plate that is fastened to the bows. Fig. 2 represents the thimble. Fig. 3 represents the post or stem with a solid nut. Fig. 4 represents the top-prop put together with a section of the joint.

In the accompanying drawings, A is a plate with a threaded hole in it at $a$ to receive the post or stem B, which is also threaded, so as to screw into the plate A. The stem B has a solid nut-head at one end and one side of the threaded stem flattened at $b$.

C is a thimble with a hole through the center, flattened on one side so as to allow the stem B to pass through it and fit so that neither can turn without the other.

D is an ear on the thimble C with a hole through it that corresponds with the holes $e\,e$ in the plate A.

$f\,f$ is a section of the joint.

The use of my invention is as follows: The plate A is first fastened to the bows and the covering for the top drawn over it. Then the section of the joint $f\,f$ is put on the stem B, and next to the joint end the thimble C is put on the stem. The stem is screwed into the plate A, the thimble C being compelled to turn with the stem B. When turned up sufficiently to allow $f\,f$ to work without rattling, the thimble C will be resting on the covering of the top. The hole in the ear D will be over one of the holes $e\,e$ in the plate A, when a screw or tack put through both holes will lock the stem B and thimble C so that they cannot get loose.

It will be seen that the device is simple of construction and is effective in its operation, preventing the joint from rattling or the loosening of top-prop nuts, and that the covering can be put on without straining or wrinkling it by being drawn over a projecitng stem or prop.

Having thus fully described my invention, what I claim as new, and desire to secure by Letters Patent, is—

The combination of a bolt having a solid head at one end and a thread at the other, a threaded socket-plate, a thimble having a tang or projection for fastening it to the socket-plate, and a keyed connection for securing it to the bolt, substantially as described.

In witness whereof I affix my signature in the presence of two witnesses.

AUGUSTUS A. LINES. [L. S.]

Witnesses:
 H. C. HENRY,
 H. J. BRYANT.